Nov. 18, 1941.　　　　F. H. HISE　　　　2,263,240
LANDING WHEEL MOUNTING FOR AIRCRAFT
Filed Feb. 1, 1939
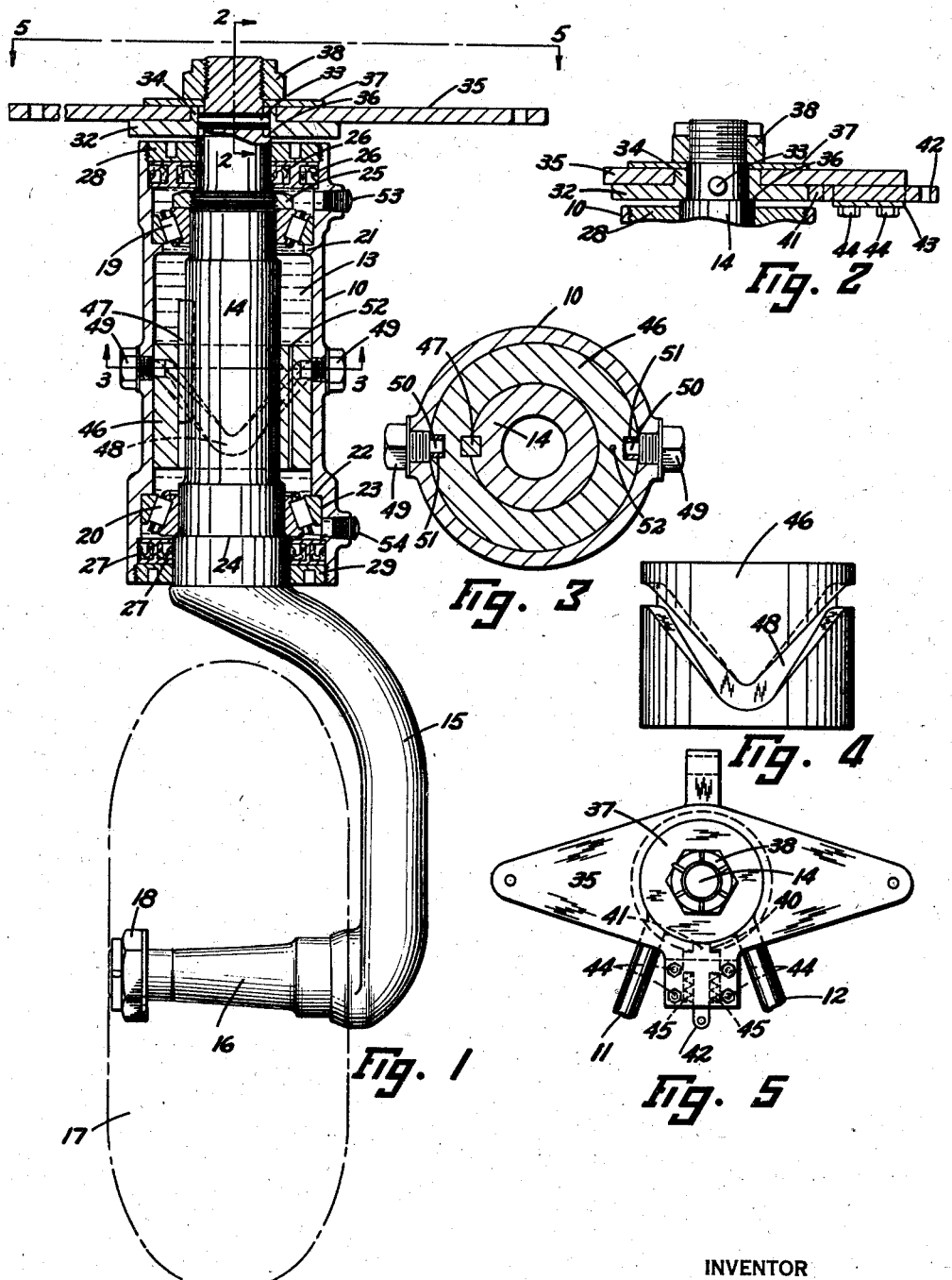
INVENTOR
FRED H. HISE
BY
ATTORNEY Patented Nov. 18, 1941

2,263,240

UNITED STATES PATENT OFFICE 2,263,240

LANDING WHEEL MOUNTING FOR AIRCRAFT

Fred H. Hise, Lakewood, Ohio, assignor to The Cleveland Pneumatic Tool Company, Cleveland, Ohio, a corporation of Ohio Application February 1, 1939, Serial No. 254,015

5 Claims. (Cl. 244—109)

This invention relates broadly to aircraft, but more particularly to a new and improved nose or tail wheel assembly for use with aircraft.

One object of this invention is to provide a nose or tail wheel assembly of the caster type with means for checking lateral rotation of the wheel, thereby eliminating oscillations or shimmy of the wheel during landing or taxiing of the craft, which oscillations have been found to be detrimental to the comfort of the passengers, as well as resulting in the premature wear and often breakage of the landing gear.

Another object of this invention is to produce an improved steerable nose or tail wheel assembly with means preventing free swivel or shimmy of the wheel, thereby relieving the steering controls from shocks and stresses resulting from sudden lateral forces to which the wheel may be subjected when contacting the ground during landing or taxiing.

Other objects and advantages more or less ancillary to the foregoing reside in the specific construction and aggroupment of the elements peculiar to this structure, as will become apparent from a more complete examination of this specification.

In the drawing:

Fig. 1 is a rear elevational sectional view of a wheel mounting embodying the invention.

Fig. 2 is a longitudinal sectional view taken in a plane indicated by line 2—2 in Fig. 1.

Fig. 3 is an enlarged cross sectional view taken in a plane indicated by line 3—3 in Fig. 1.

Fig. 4 is a side elevational view of one of the parts shown in section in Fig. 1.

Fig. 5 is a top plane view looking in the direction of the arrows 5—5 in Fig. 1.

Referring to the drawing, the improved wheel mounting includes a housing 10 which may be secured to the craft by any suitable means such as braces 11 and 12 welded or otherwise affixed to the housing. Internally, the housing 10 is formed with a piston chamber 13 having rotatable therein the spindle 14 of a wheel carrying knuckle 15 formed with an horizontal axle 16 on which is rotatably mounted a landing wheel 17, which wheel is held in position by a nut 18. As shown in Fig. 1, the knuckle 15 is shaped to follow the contour of the wheel 17, while its integral spindle 14 is journaled within upper and lower thrust bearings 19 and 20, which bearings are adequately mounted within the housing 10, the former against downward movement by its engagement with an annular shoulder 21, while the latter rests against the bottom 22 of a counterbore 23. The spindle is held against endwise movement relative to the housing 10 by an annular shoulder 24 engaging the bearing 20 and by a nut 25 screwed on the spindle and engaging the bearing 19. The upper and lower ends of the housing 10 are closed by packing rings 26 and 27 respectively, the rings 26 being held in position by a retaining nut 28 and the rings 27 by a similar nut 29, which packing rings form a fluid tight joint between the spindle and the housing.

The spindle extends through the upper end of the housing to receive a disk 32 rigidly secured to the spindle by a cross pin 33, which disk is formed with a shank 34 having rotatably mounted thereon a steering arm 35. The disk rests on an annular shoulder 36 formed on the upper end of the spindle 14, while the end of the shank 34 engages a washer 37 held in position by a nut 38 screwed on the threaded upper end of the spindle. Formed on the peripheral wall of the disk 32, there is a slot or notch 40 adapted to receive the inner end 41 of a plunger 42 slidably carried by the steering arm 35 between the steering arm and a plate 43 mounted on the underside of the arm by bolts 44. The plunger 43 is normally urged toward the disk 32 by compression springs 45 operatively mounted between the arm 35 and the plate 43.

Reciprocable within the piston chamber 13, there is a piston 46 slidable on the spindle 14 but held against rotation relative thereto by a relatively long key 47. The piston is machined to fit closely within the chamber 13 and has its peripheral wall provided with a cylinder cam in the form of an endless herring-bonelike groove 48. Carried by the cylinder 10, there are two diametrically opposed cap screws 49 each formed with a reduced inner end or trunnion 50 projecting into the groove 48 and carrying a roller 51 operatively engaging the side walls of the groove. Extending through the piston, there is a small orifice 52, the purpose of which will be explained later. Near its upper end, the housing 10 is provided with a filler plug 53, and near its lower end with a drain plug 54.

After the mechanism is assembled, oil is poured into the housing 10 by removing the filler plug 53. When the chamber 13 between the packings 26 and 27 is completely filled with oil and the plug 53 is again screwed in position, the mechanism is ready for operation.

In the operation of the device, rotation of the spindle 14 resulting from the lateral rotation of the wheel 17 is transmitted to the piston 46 by the key 47. Due to the operative engagement of the rollers 51, carried by the trunnions 50, with the side walls of the groove 48, the rotation of the piston 46 will cause the up and down motion or reciprocation of the piston relative to the cylinder 10, causing the oil within the chamber 13 to be displaced from one to the other side of the piston via the small orifice 52. This displacement of the liquid, which is controlled by the orifice 52, will prevent free reciprocation of the piston 46 and consequently act as a brake to the rotary movement of the spindle 14 and the consequential lateral rotation of the wheel 17.

When the plunger 42 is positioned as shown in Fig. 5, that is, with its inner end 41 located within the notch 40, the steering arm 35 is locked to the disk 32 and consequently to the spindle 14 by the pin 33, thereby enabling positive steering of the wheel through steering cables or the like usually connected to the apertured ends of the steering arm 35. In this instance, the displacement of the liquid through the orifice 52 is calculated to enable a relatively free steering of the wheel, but to prevent any sudden rotation of the spindle which might be transmitted thereto by contact of the wheel 17 with an uneven ground, thereby preventing shocks or stresses to be suddenly transmitted to the steering controls normally connected to the end of the steering arm 35.

When it is desired to transform the steerable wheel construction into a free swingable wheel arrangement, the plunger 42 may simply be pulled out of the notch 40, thereby disconnecting the steering arm 35 from the spindle 14 and enabling the wheel 17 to swing independently of the steering controls while still subjected to the action of the shimmy preventing means including the piston 46.

From the foregoing description, it will be understood that the oil stored within the portions of the housing 10 above and below the piston 46, which portions form two chambers separated by the piston, actually acts as a brake or a resistance preventing free rotation of the spindle 14, the intensity of this resistance being of course controlled by the size of the orifice 52. The bearings 19 and 20 being located within the chamber 13 are submerged in the oil, which oil is prevented from leaking out of the housing 10 by the packings provided within the upper and lower ends of the housing. The snubbing mechanism being entirely enclosed within the housing, forms a compact assembly protected from dust and constantly well lubricated by the oil stored within the chamber 13.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. A wheel mounting comprising a housing, a wheel carrying member including a spindle rotatable within said housing, a reciprocable piston on said spindle connected thereto for rotation therewith, a herring-bonelike endless groove on said piston, diametrically opposed trunnions carried by said housing engageable with the side walls of said groove for effecting the reciprocation of said piston by virtue of its rotation, and means within said housing checking the reciprocatory movement of said piston.

2. A wheel mounting for aircraft, comprising a substantially vertical housing, longitudinally spaced coaxial bearings within said housing, a wheel carrying member including a spindle journalled within said bearings and extending through the upper end of said housing, means on said housing and spindle engaged by said bearings for preventing longitudinal movement of the spindle relative to said housing, a lubricant chamber between said housing and spindle extending from one to the other of said bearings, packing means between said housing and spindle preventing escape of the lubricant from said chamber, a steering arm rotatably mounted on the portion of said spindle extending through the upper end of said housing, and a lock carried by said spindle operatively engageable with said arm for preventing relative rotation between said spindle and arm.

3. A wheel mounting, comprising a housing, longitudinally spaced coaxial bearings within said housing, a chamber between said bearings having liquid stored therein, a wheel carrying member including a spindle extending through said chamber having its end portions journalled in said bearings, a reciprocable piston in said chamber active on said liquid for effecting its transfer from one to the other end portion of said chamber and connected to said spindle for rotation therewith, a herring-bonelike endless groove on the peripheral wall of said piston, means fixed on said housing engaging the side walls of said groove for effecting reciprocation of said piston upon its rotation, and means in said chamber controlling the transfer of the liquid from one to the other end of said chamber by virtue of the reciprocation of said piston.

4. A wheel mounting comprising a housing, a wheel carrying member including a spindle journaled within said housing, a piston on said spindle connected thereto for rotation therewith and capable of back and forth axial movement relative thereto, cooperating cam means between said housing and piston constantly responsive to the rotation of said piston in either direction for effecting its back and forth axial movement, and means within said housing active on the ends of said piston for preventing the back and forth axial movement thereof at a rate of speed greater than a predetermined maximum.

5. A wheel mounting for aircraft, comprising a substantially vertical housing, an upper and a lower bearing within said housing, a wheel carrying member including a spindle journaled within said bearings for rotation relative to said housing, packing members between said housing and spindle one above and the other below said upper and lower bearings respectively, a lubricant chamber surrounding said spindle extending from one to the other of said packing members, and rotation retarding means within said chamber operatively associated with said spindle.

FRED H. HISE.